United States Patent
Tanimoto et al.

(10) Patent No.: US 7,210,308 B2
(45) Date of Patent: *May 1, 2007

(54) REFRIGERATOR

(75) Inventors: Yasuaki Tanimoto, Hyogo (JP); Chie Hirai, Osaka (JP)

(73) Assignee: Matsushita Refrigeration Company, Shiga (JP)

( * ) Notice: Subject to any disclaimer, the term of this patent is extended or adjusted under 35 U.S.C. 154(b) by 118 days.

This patent is subject to a terminal disclaimer.

(21) Appl. No.: 10/258,130

(22) PCT Filed: Dec. 28, 2000

(86) PCT No.: PCT/JP00/09388

§ 371 (c)(1),
(2), (4) Date: Jan. 11, 2003

(87) PCT Pub. No.: WO01/81818

PCT Pub. Date: Nov. 1, 2001

(65) Prior Publication Data

US 2003/0167789 A1  Sep. 11, 2003

(30) Foreign Application Priority Data

Apr. 21, 2000  (JP) ............................. 2000-120794

(51) Int. Cl.
*F25D 11/00* (2006.01)
*F25D 23/00* (2006.01)

(52) U.S. Cl. ................... 62/440; 220/592.02

(58) Field of Classification Search .... 62/457.1–457.7, 62/298, 440, 447, 452, 98; 220/592.02–592.09, 220/592.2, 592.27, 592.7
See application file for complete search history.

(56) References Cited

U.S. PATENT DOCUMENTS 3,167,933 A * 2/1965 Beckman et al. ............. 62/371
3,715,265 A * 2/1973 Allen et al. ................. 428/143

(Continued)

FOREIGN PATENT DOCUMENTS

DE          210 893           6/1984

(Continued)

OTHER PUBLICATIONS

Watanabe et al., Heat Insulating Container and its Manufacturing Method, Oct. 9, 2003, US PGP, vol. 1, all pages.*

(Continued)

*Primary Examiner*—Chen-Wen Jiang
(74) *Attorney, Agent, or Firm*—Wenderoth, Lind & Ponack, L.L.P.

(57) ABSTRACT

By using a core made of laminated sheets of inorganic fibers having a particular shape and composition as part of a vacuum heat insulator for a heat insulation box, a heat insulation box excellent in long-term heat insulating properties and productivity can be provided. The vacuum heat insulator can be shaped easily. Therefore, a vacuum heat insulator suitable for a required heat insulation portion can be produced easily and applied to a heat insulation box. This property can increase coverage of the vacuum heat insulator on the heat insulation box, thus improving heat insulating properties of the heat insulation box. This can improve heat insulating properties and productivity of a refrigerator, thermal storage box, cold storage box, or vending machine, and contribute to energy savings.

24 Claims, 13 Drawing Sheets

U.S. PATENT DOCUMENTS

| | | | |
|---|---|---|---|
| 4,668,555 A * | 5/1987 | Uekado et al. | 428/69 |
| 4,923,077 A * | 5/1990 | Van Iperen et al. | 206/527 |
| 5,082,335 A * | 1/1992 | Cur et al. | 312/401 |
| 5,332,699 A * | 7/1994 | Olds et al. | 501/36 |
| 5,660,924 A * | 8/1997 | Yamaji et al. | 442/378 |
| 5,885,682 A * | 3/1999 | Tanimoto et al. | 428/69 |
| 5,934,085 A * | 8/1999 | Suzuki et al. | 62/98 |
| 5,989,371 A * | 11/1999 | Nishimoto | 156/73.6 |
| 6,001,450 A * | 12/1999 | Tanimoto et al. | 428/69 |
| 6,209,343 B1 * | 4/2001 | Owen | 62/457.2 |
| 6,305,768 B1 * | 10/2001 | Nishimoto | 312/406 |
| 6,938,968 B2 * | 9/2005 | Tanimoto et al. | 312/406 |

FOREIGN PATENT DOCUMENTS

| | | |
|---|---|---|
| DE | 29709025 U1 * | 8/1997 |
| EP | 0 737 833 | 10/1996 |
| EP | 0 756 142 A2 | 1/1997 |
| GB | 715174 | 9/1954 |
| JP | S30-3139 | 5/1955 |
| JP | S60-208226 | 10/1985 |
| JP | 184058 | 6/1986 |
| JP | 45158 | 1/1992 |
| JP | 4-174272 | 6/1992 |
| JP | 109994 | 6/1992 |
| JP | 4-266967 | 9/1992 |
| JP | H5-63715 | 9/1993 |
| JP | 9-133289 | 5/1997 |
| JP | 09138058 A | 5/1997 |
| JP | 10-205994 | 8/1998 |
| JP | 10-205996 | 8/1998 |
| JP | 8-303683 | 11/1999 |
| JP | 2000-95890 | 4/2000 |
| JP | 2000-304428 | 11/2000 |
| WO | 99/57073 | 11/1999 |

OTHER PUBLICATIONS

Zucker et al., Thermal Container, Sep. 19, 2002, US PGP, vol. 1, all pages.*

* cited by examiner

REFRIGERATOR

FIELD OF THE INVENTION

The present invention relates to a heat insulation box that can be used for an apparatus, such as a refrigerator, thermal storage box, cold storage box, vending machine, or water heater. It also relates to a vacuum heat insulator used for these apparatus and to structure of the vacuum heat insulator.

BACKGROUND OF THE INVENTION

Energy saving in electric appliances is an unavoidable important problem that has been addressed in recent years. Also, in a heat insulation box used for a refrigerator and other various kinds of electric appliances, improvement in performance of a heat insulator is becoming essential. On the other hand, positive efforts to conserve terrestrial environment is becoming important. One of urgent requests with regard to electric appliances is energy saving; thus, improving heat insulating properties of heat-related electric apparatus is becoming an important problem to address.

One heat insulator that has been recently developed, mainly by manufacturers of electric appliances and heat insulators for energy and space saving, is a vacuum heat insulator that has excellent heat insulating properties. An example of the vacuum heat insulator is made by covering a core, made of a rigid urethane foam having continuous pores with a gas-barrier laminated film, and evacuating an inside thereof. This vacuum heat insulator has heat insulating properties that are approximately 2.5 times heat insulating properties of conventional rigid or soft urethane foam or resin foam.

Japanese Patent Examined Publication No. H05-63715 discloses a vacuum heat insulator using a fibrous aggregate. A use of a fibrous aggregate of glass fibers, ceramic fibers, or resin fibers as a core of a vacuum heat insulator provides a light and deformable vacuum heat insulator.

Moreover, according to Japanese Patent Examined Publication No. 30-3139, a vacuum heat insulator made of a core of glass fibers, each having a diameter of 250 µm or smaller, is proposed. Inside of the vacuum heat insulator is maintained to a degree of vacuum of 0.75 Pa or lower. Japanese Patent Laid-Open Publication No. 60-208226 discloses randomly laminated inorganic fibers, having a small diameter, in a direction perpendicular to a heat transfer direction, and other fibers are sewn perpendicularly halfway to the laminated inorganic fibers to form a core of a vacuum heat insulator.

An example of binding fibers using a binder is disclosed in Japanese Patent Laid-Open Publication No. H09-138058. In this invention, a fiber material such as glass wool is molded using an organic binder, and used as a core of a vacuum heat insulator.

However, these conventional techniques have following problems and thus are difficult to be put to practical use.

For example, the vacuum heat insulator disclosed in Japanese Patent Examined Publication No. 30-3139 is difficult to be formed into a specific shape because it is made of glass fibers only. When a sheet-form vacuum heat insulator is to be produced, using glass fibers as a core of the vacuum heat insulator requires much manpower because the fibers themselves do not have shape-keeping properties.

Since inorganic fibers are sewn with other fibers in Japanese Patent Laid-Open Publication No. 60-208226, shape-keeping properties are imparted to the fibers themselves, and the problem with regard to shape-keeping properties is solved. However, as general methods cannot be used to sew the fibers, while reducing heat conduction, this process has a problem of high production costs.

Japanese Patent Laid-Open Publication No. H09-138058 proposes binding fibers together using an organic binder as a method of imparting shape-keeping properties to the fibers. However, this publication only discloses a type of the binder and does not disclose an amount of the binder or a composition of the fibers. Thus, there is a problem in that it is difficult to bind fibers together using the binder while maintaining heat insulating properties suitable for a vacuum heat insulator. In addition, when organic fibers are used for a core, the core generates gases during a long-term usage, and thus, heat insulating properties may be degraded.

In order to improve heat insulating properties of a heat insulation box, a heat insulation box that uses a heat insulator using a resin foam or powder as the core has been proposed. Such a core has a problem of long-term heat insulating properties or workability. As described above, conventional techniques have problems such as poor workability of the vacuum heat insulator, or a premature stage of product development, and advantages of fiber aggregates are not utilized sufficiently.

In consideration of the above problems, the present invention aims to provide a heat insulation box excellent in heat insulating properties and in productivity by using a vacuum heat insulator that includes a core made of laminated sheets of inorganic fibers. The core of the vacuum heat insulator is excellent in long-term reliability and in workability.

SUMMARY OF THE INVENTION

In order to address the above problems, a heat insulation box of the present invention uses, as a heat insulator, a vacuum heat insulator that includes a core made of laminated sheets of an inorganic fibers, and a laminated film sandwiching the core. Further, a laminated film disposed on one side of the laminated sheets, and a laminated film disposed on another side of the laminated sheets, are different in structure from each other. Moreover, the vacuum heat insulator includes an adsorbent as required.

DETAILED DESCRIPTION OF THE PREFERRED EMBODIMENTS

Exemplary embodiments of the present invention are described hereinafter using specific examples.

First Embodiment

Figure 1:
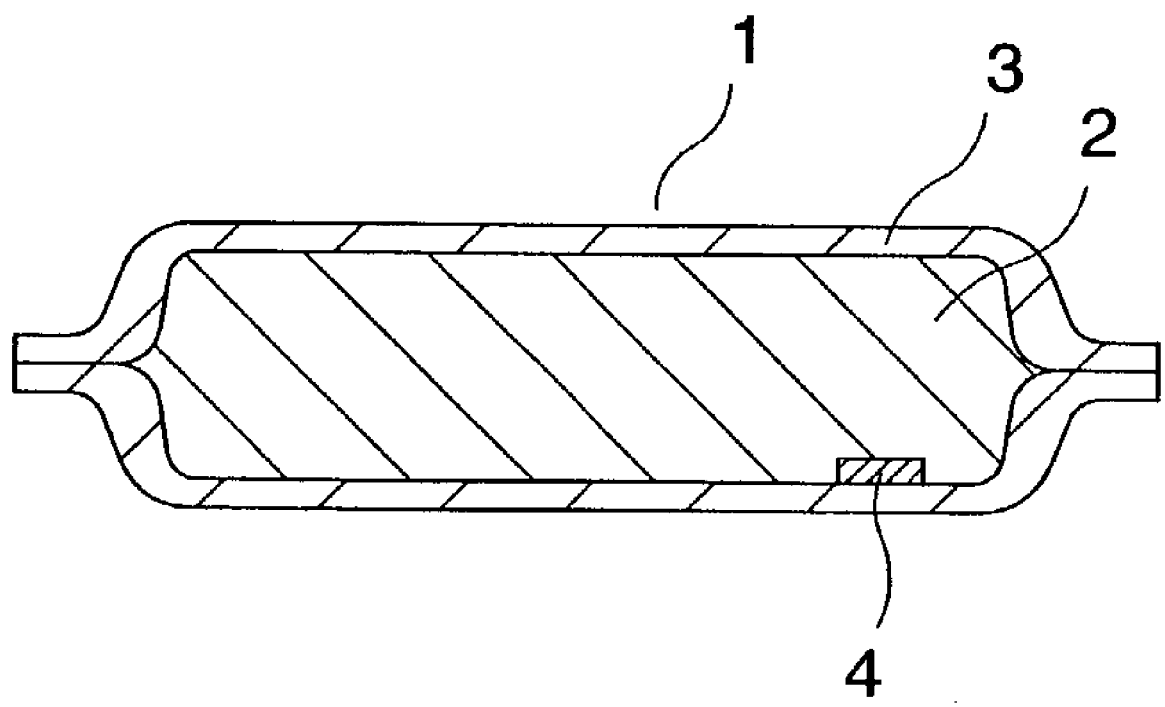
FIG. 1 is a sectional view of a vacuum heat insulator of the present invention.
Figure 2:
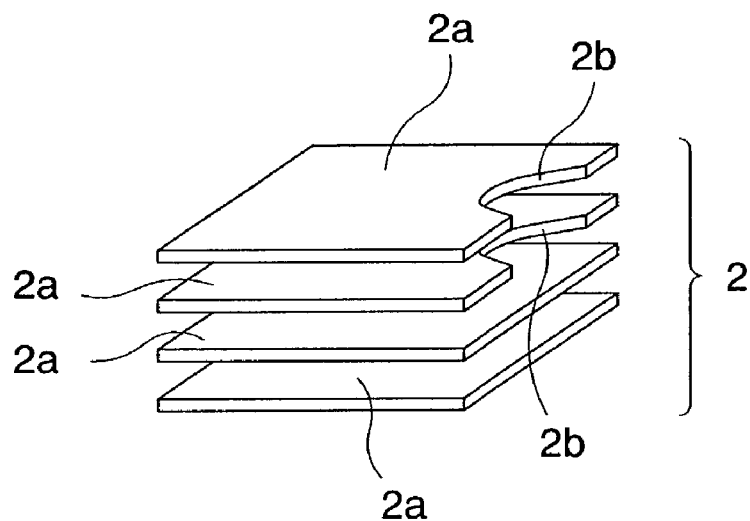
FIG. 2 shows a cut-off portion provided along a side of inorganic fiber sheets of a core of a vacuum heat insulator of the present invention.

FIG. 1 is a sectional view of a vacuum heat insulator in accordance with an exemplary embodiment of the present invention. Vacuum heat insulator 1 comprises core 2, enveloping member 3, and adsorbent 4.

One side of the enveloping member 3 is made of a four-layer laminated film. An outermost layer of the laminated film is a polyamide layer (16 μm in thickness) as a surface protection layer and an inner layer of the laminated film is a polyethylene terephthalate layer (12 μm in thickness). Enveloping member 3 further has an aluminum foil (6 μm in thickness) as an intermediate layer, and a high-density polyethylene layer (50 μm in thickness) for heat-sealing.

Another side of the enveloping member 3 is made of a four-layer laminated film comprising surface protection layers of a polyamide layer (16 μm in thickness) and a polyethylene terephthalate layer (12 μm in thickness), an intermediate film layer made of an ethylene-vinyl alcohol copolymer resin composite film (15 μm in thickness) having a vacuum deposited aluminum on an inner side thereof, and a heat seal layer made of a high-density polyethylene layer (50 μm in thickness).

In the vacuum heat insulator 1 of the present invention, a laminated film of an aluminum foil is used for one side of the enveloping member 3, and another side of the enveloping member is made of the laminated film having the vacuum deposited aluminum. Thus, heat conduction is adjusted according to a temperature of an object that the vacuum heat insulator contacts. As a result, the vacuum heat insulator in its entirety can inhibit a heat leak caused by highly heat conductive aluminum foil, and an amount of gases entering into the vacuum heat insulator can be suppressed because of an existence of the deposited aluminum film which is excellent in gas barrier properties.

In other words, because the aluminum foil is a metal film, it permits no gas entry even at elevated ambient temperatures. However, the resin layers having thereon the vacuum deposited aluminum has permeability with regard to gases in accordance with temperature increase. Gas-permeability decreases the degree of vacuum in the vacuum heat insulator, thus deteriorating heat insulating properties of the vacuum heat insulator. To avoid this deterioration, it is effective to place the aluminum foil side of enveloping member 3 of the vacuum heat insulator on a side exposed to higher temperatures. Thus, the structure of the vacuum heat insulator of the present invention can suppress degradation of performance caused by the heat leak and gas entry at the same time.

However, the structure of the vacuum heat insulator of the present invention needs not to be limited to the above structure. On the assumption of cost reduction of the enveloping member and use of the vacuum heat insulator at high temperatures, crystalline polypropylene (50 μm in thickness) can be used as the heat seal layer in the above structure of enveloping member 3, for example. This structure can improve a heat-resistant temperature of the vacuum heat insulator.

Alternatively, eliminating the polyamide layer as the outermost layer and slightly thickening the polyethylene terephthalate layer can reduce cost due to elimination of the polyamide layer. In this case, degradation of bending resistance resulting from elimination of the polyamide can be solved by a thickening of the polyethylene terephthalate layer.

Moreover, depending on circumstances where the vacuum heat insulator is used, materials and structures of the enveloping member 3 should be selected. When the vacuum heat insulator is used at relatively low temperatures, such as in a refrigerator or cooler box, high-density polyethylene or the like is suitable as a material for the heat seal layer. When the vacuum heat insulator is used at relatively high temperatures, such as in a water heater, a crystalline polypropylene, the ethylene vinyl alcohol copolymer resin, the polyethylene terephthalate resin or a polyethylene naphthalate resin are suitable.

Alternatively, the enveloping member can be made of one kind of laminated film without differentiating front and back sides of the vacuum heat insulator. In this case, sealing types of the enveloping member 3 are not limited to a three-side seal. A so-called "gusset bag" or "pillow bag" can be used. The use of these bags can reduce a number of protrusions along an outer periphery of enveloping member 3 resulting from heat-sealing, and further reduce a number of steps of folding the protrusions.

Adsorbent 4 is placed in a cut-off portion provided in a part of core 2, except in uppermost and lowermost sheets thereof. This placement can address a problem of the adsorbent 4 protruding from the core 2 and breaking enveloping member 3 during production of the vacuum heat insulator.

As a material of adsorbent 4, the COMBO GETTER supplied by SEAS Getters is excellent, which can absorb and remove moisture and carbon dioxide as well as oxygen and nitrogen. Therefore, degradation of degree of vacuum of the vacuum heat insulator 1 can be inhibited for a long period of time. Other examples of usable materials include a moisture adsorbent, such as calcium oxide and calcium chloride, and AGELESS (a registered trademark of Mitsubishi Gas Chemical Co., Inc). As a carbon dioxide adsorbent, any materials comprising calcium hydroxide can be used. When these inorganic compounds are further combined with the above COMBO GETTER of the SEAS Getters, the effect as adsorbent is improved and the properties of vacuum heat insulator 1 can be maintained for a long period of time.

Core 2 is laminated with four sheets of inorganic fiber 2a. Cut-off portion 2b is provided along a side of inorganic fiber 2a. Adsorbent 4 is disposed in the cut-off portion 2b. This structure prevents adsorbent 4 from forming a protrusion on a surface of the vacuum heat insulator. This structure makes fluid resistance of gases on a surface of the sheets different from that between the four laminated sheets at a time of evacuation of the vacuum heat insulator. As a result, vortex flow occurs in an air flow of sucked air, and the vortex flow improves evacuation efficiency, thus remarkably improving productivity.

Figure 3:
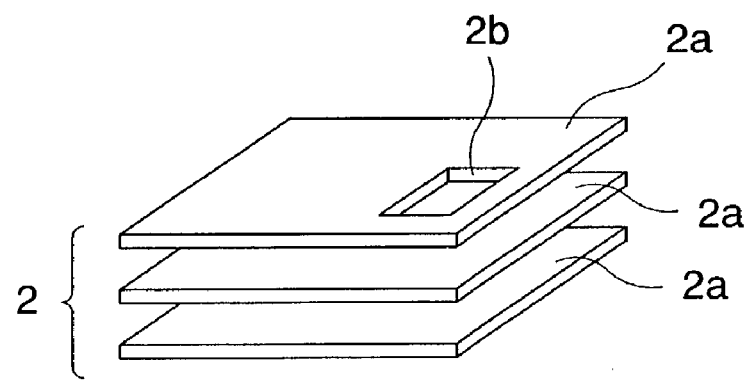
FIG. 3 shows a cut-off portion provided in a part of an inorganic fiber sheet as an uppermost sheet.
Figure 4:
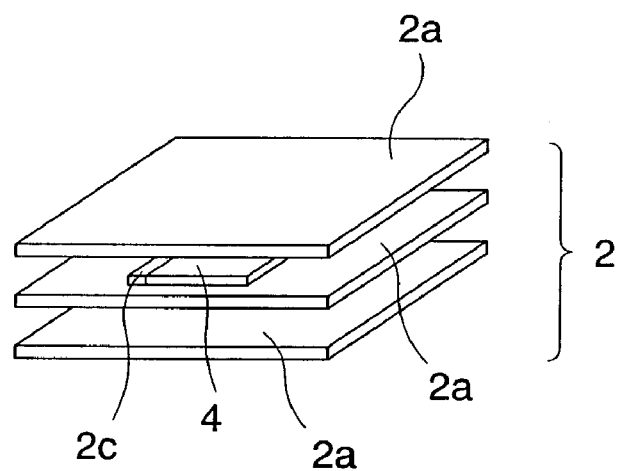
FIG. 4 shows a cut-off portion provided in a part of an inorganic fiber sheet as an intermediate sheet.
Figure 5:
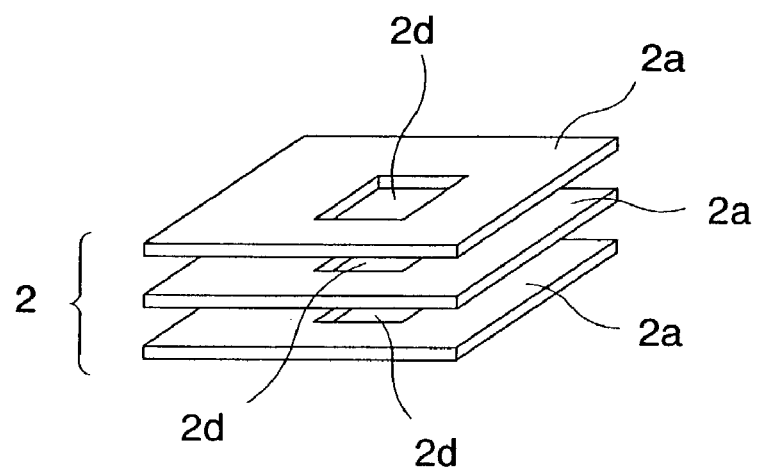
FIG. 5 shows cut-off portions provided in parts of three inorganic fiber sheets.

As another example of core 2, as shown in FIG. 3, recess 2b can be formed in a first sheet of the inorganic fiber 2a to house the adsorbent 4. Alternatively, as shown in FIG. 4, through hole 2c can be formed through an intermediate sheet of inorganic fiber 2a to house the adsorbent 4. Alternatively, as shown in FIG. 5, through holes 2d can be formed through three of the sheets of the inorganic fiber 2a to house the adsorbent 4.

The number of sheets 2a to be laminated is not specifically limited. However, in order to prevent adsorbent 4 from forming a protrusion, at least three sheets are preferable. In consideration of improvement in productivity, at least four sheets are more preferable.

In the present embodiment, the core 2 contains 50 to 65 wt. % of $SiO_2$, 10 to 20 wt. % of $Al_2O_3$ and CaO each, and 1 to 4 wt. % of MgO, based on the composition of the material of the core.

$SiO_2$ is used as a major constituent because this material has a low heat conductivity and is inexpensive. The content of $SiO_2$ suitable for the vacuum heat insulator 1 preferably ranges from 50 to 65 wt. % of the composition of the material of the core 2, and more preferably from 55 to 60 wt. % thereof.

$Al_2O_3$ is added so as to improve a heat resistance of the core 2. In consideration of heat conductivity of $Al_2O_3$ itself, a small content thereof is more preferable. When a balance of heat resistance and heat conductivity is considered, the recommendable amount of $Al_2O_3$ to be added ranges from 10 to 20 wt. %. If an amount of $Al_2O_3$ of is less than 10 wt. %, heat resistance is poor. If an amount exceeds 20 wt. %, heat insulating properties of the vacuum heat insulator 1 tend to degrade.

On the other hand, CaO serves to adsorb moisture, and an added amount of 10 to 20 wt. % of CaO provides excellent heat insulating properties. Even when the amount is increased to more than 20 wt. %, moisture adsorption is not so improved. If the amount is less than 10 wt. %, improvement of performance of the vacuum heat insulator 1 with regard to moisture adsorption is not recognized.

Addition of MgO is effective in improving mutual cohesive forces of the fibers. Particularly when fiber sheets are produced by a wet paper forming method, addition of MgO is more effective. With addition of 1 to 4 wt. % of MgO, improvement in cohesive forces is recognized, and with an amount exceeding 4 wt. %, there is no additional improvement. When the added amount of MgO is reduced, the cohesive forces decreases. Therefore, addition of 1 to 4 wt. % of MgO is preferable.

The material composition of the fibers used for core 2 is described as above. Because a diameter and a bulk density of the fibers also influence heat insulating properties of the vacuum heat insulator 1, optimum physical properties should be specified.

As for the fiber diameter of the core 2, 1 to 3 μm is preferable. For a fiber diameter smaller than 1 μm, manpower in production of the fibers remarkably increases. Moreover, as special equipment for producing fibers is required, industrially economical production becomes difficult. In addition, fibers are excessively entangled with each other to form large fibrous aggregates and thus large pores are formed. This increases gas heat conductivity based on gas heat conduction, thus degrading heat insulating properties.

When the fiber diameter is larger than 3 μm, pores formed by aggregation of the fibers are large. For this reason, heat conduction by gases exhibits a greater influence; thus, heat insulating properties degrade. In order to inhibit heat conduction by gases, a degree of vacuum of approximately 13 Pa, which allows efficient industrial production, is insufficient, and a degree of vacuum of approximately 0.13 Pa is required. But, this degree of vacuum renders efficient industrial production difficult.

Therefore, in consideration of industrial productivity, a fiber diameter ranging from 1 to 3 μm is suitable. A fiber diameter ranging 2 to 3 μm is more preferable.

On the other hand, even material having such a fiber diameter range may adversely affect heat insulating properties of the vacuum heat insulator if bulk density of the fibers is not appropriate. When bulk density of the fibers is higher than 0.3 g/cm$^3$, solid heat conduction of the fibers has a greater influence, and heat insulating properties are degraded. In addition, such a high bulk density reduces flexibility of the vacuum heat insulator imparted by use of a fiber material, thus making the vacuum heat insulator unsuitable for an application to protruded and recessed portions. Application to such portions is one of the characteristic features of the present invention.

When the bulk density of the fiber is lower than 0.1 g/cm$^3$, the proportion of fibers in a given space reduces and air gaps increase. This results in an increase of gas heat conduction, thus degrading heat insulating properties of the vacuum heat insulator. Another problem is that atmospheric compression at a time of production of the vacuum heat insulator increases the degree of deformation and makes it difficult to produce a vacuum heat insulator of stable shape.

As a result, the bulk density of a fiber material suitable for the vacuum heat insulator preferably ranges from 0.1 to 0.3 g/cm$^3$, and more preferably from 0.1 to 0.2 g/cm$^3$.

In order to form fibers into a sheet, it is desirable to bind the fibers using a binder. However, an inappropriate type of binder or an amount of binder affects heat insulating properties of the vacuum heat insulator.

For example, using an inorganic material as a binder results in a high density of a sheet produced from the fibers and binder. Even with organic binders, thermosetting resins, such as phenolic resin, cause gasification of unreacted monomers in a vacuum atmosphere. Gasification degrades the degree of vacuum, thus adversely affecting heat insulating properties of the vacuum heat insulator.

On the other hand, when thermoplastic resins are used as a binder, the above adverse effect caused by unreacted monomers can be reduced. When sheets are produced by the wet paper forming method, a use of water-soluble polymers is preferable as a binder. From such a viewpoint, water-soluble acrylic resins are suitable. Being water-soluble polymers, the water-soluble acrylic resins can uniformly disperse on surface of fibers, even when a sheet is produced by the wet paper forming method. Thus, a fibrous sheet having uniform bonding strength can be obtained.

Even when water-soluble acrylic resins are used as a binder, an amount to be added is an important factor. For an amount of less than 3 wt. %, a sheet of fibers can be formed but is broken when wound like a roll. Thus, stable production is difficult. For an amount exceeding 10 wt. %, viscosity of a slurry used in production of sheets by the wet paper forming method is high, thus deteriorating productivity.

For these reasons, the suitable amount of an acrylic binder to be added ranges from 3 to 5 wt. %. An amount from 3 to 4 wt. % is more preferable.

However, when productivity of sheets of fibers can be neglected, excellent heat-insulating properties for a vacuum heat insulator can be obtained even without using a binder.

Hereinafter a specific method of producing the vacuum heat insulator 1 of the present invention is described.

The core 2 of the above structure is dried in a drying oven at a temperature of 130° C. for one hour. Thereafter, enveloping member 3 is filled with the core 2 together with adsorbent 4, evacuated, and then sealed to form vacuum heat insulator 1.

A heat conductivity of the vacuum heat insulator 1 obtained in this manner ranges 0.0035 to 0.0038 W/mK at an average temperature of 24° C. It has proved that this value corresponds to approximately twice heat insulating properties of a conventional vacuum heat insulator using silica power, and a vacuum heat insulator using an open-pored urethane foam.

Second Embodiment

Figure 6:
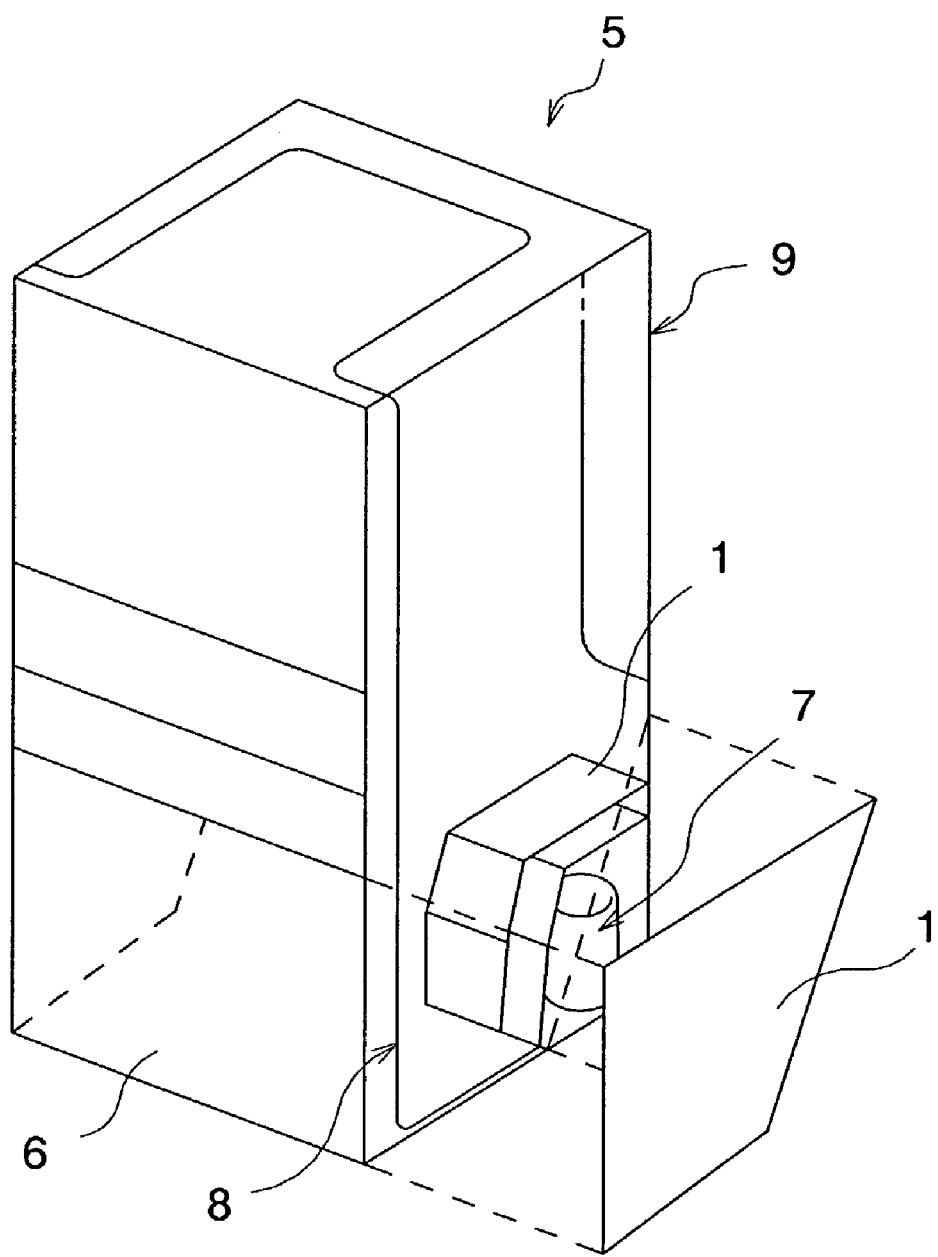
FIG. 6 is a perspective view of a refrigerator in accordance with a second exemplary embodiment of the present invention.

FIG. 6 is a perspective view of a refrigerator in accordance with a second embodiment of the present invention. Refrigerator 5 of the present embodiment uses, as heat insulator 1, the vacuum heat insulator described in the first embodiment. The refrigerator 5 has a freezer compartment 6 at a bottom and a machine room 7 at a back bottom portion. A refrigerant piping 8 is attached to outer box 9 with aluminum tapes. A rigid urethane foam (not shown) using cyclopentane as a foaming agent is filled in a space between an inner box (not shown) and outer box 9. On both side faces of the freezer compartment 6 of the refrigerator 5, vacuum heat insulator 1 produced in accordance with the first embodiment is provided. Between the vacuum heat insulator 1 on the sidefaces of the freezer compartment 6 and outer box 9, to which the vacuum heat insulator is to be attached, the high-temperature refrigerant piping 8 is provided. Moreover, the heat insulator 1 is shaped to substantially cover the sidefaces of the freezer compartment 6. Furthermore, an aluminum foil side of composite laminated film of the vacuum heat insulator 1 is placed on a side exposed to the high-temperature refrigerant piping 8.

This structure allows efficient heat insulation of sidewalls of the freezer compartment and inhibits entry of heat from the high-temperature refrigerant piping 8 into the freezer compartment 6, thus providing a refrigerator having low power consumption. Moreover, this structure can also inhibit degradation of heat insulating properties caused by liquefaction and decrease of a urethane blowing agent that occurs when cooled to a temperature of −18° C.

In addition, the refrigerator 5 of the present invention also has the vacuum heat insulator 1 between machine room 7 and freezer compartment 6. Temperature is highest in machine room 7 because a compressor operates therein. Therefore, use of the vacuum heat insulator 1 between machine room 7 and freezer compartment 6 is effective.

Having flexibility, the vacuum heat insulator 1 of the present invention can be applied along a stereoscopic shape of the machine room 7. Moreover, having high heat resistance, the vacuum heat insulator 1 can be used for space between the machine room 7 and the freezer compartment 6, and can be provided in a the machine room. Thus, a refrigerator excellent in energy saving and cost-performance can be provided.

Third Embodiment

Figure 7:
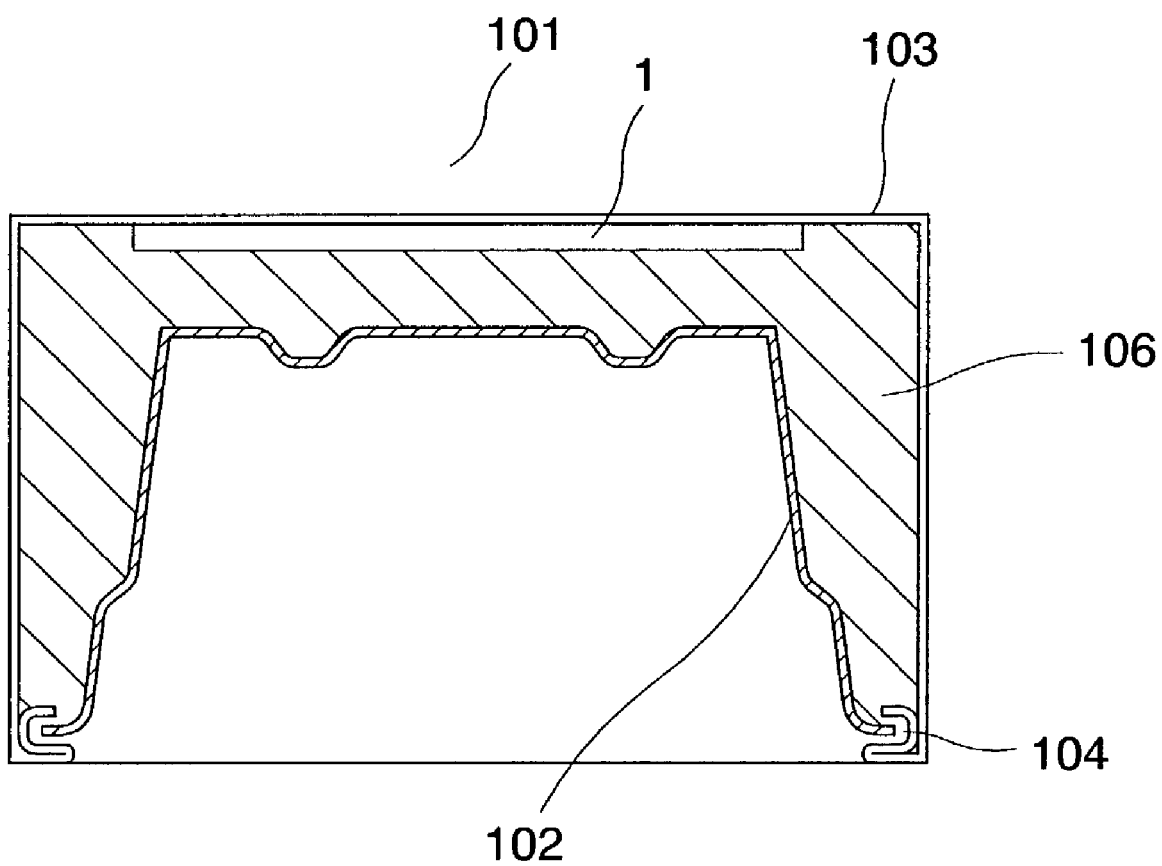
FIG. 7 is a schematic view of a heat insulation box in accordance with a third exemplary embodiment of the present invention.

FIG. 7 is a sectional view of a heat insulation box 101 in accordance with a third embodiment of the present invention. The heat insulation box 101 forming a refrigerator uses vacuum heat insulator 1 of the first embodiment. The heat insulation box 101 comprises an inner box 102 of a vacuum-molded ABS resin, an outer box 103 of a press-molded iron sheet, and a flange 104. To form the heat insulation box 101, the vacuum heat insulator 1 is provided inside of the outer box 103 beforehand, and then urethane resin is filled into a space between the inner box and outer box and foamed so as to surround the vacuum heat insulator 1 with rigid urethane foam 106.

Figure 8:
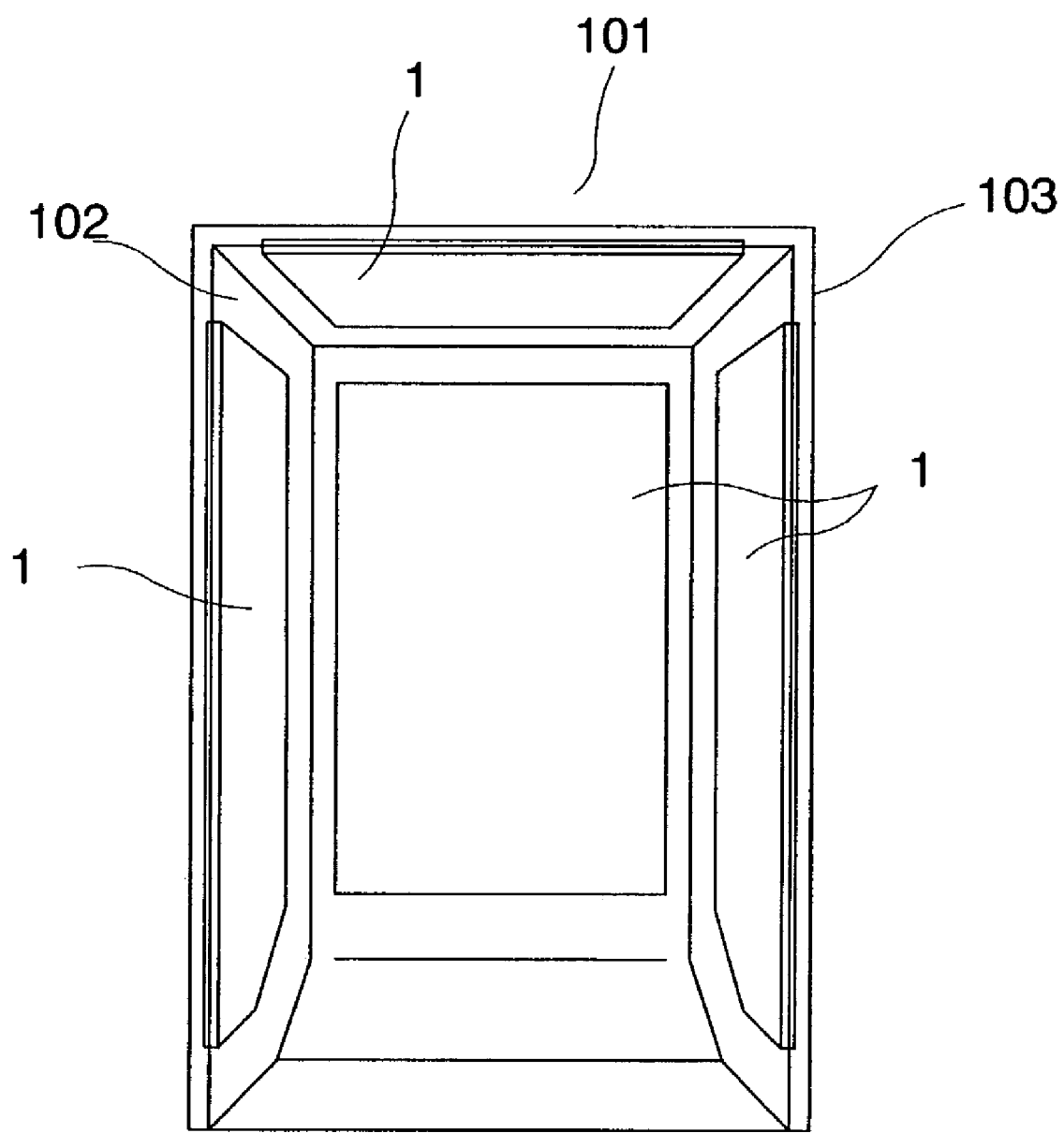
FIG. 8 is a schematic view of the heat insulation box in accordance with the third exemplary embodiment of the present invention.

FIG. 8 is a schematic view of the heat insulation box 101. A top wall of the heat insulation box is provided with one sheet of the vacuum heat insulator 1, as are a back wall and each of two side walls. According to a shape of the heat insulation box 101, the sheet of vacuum heat insulator 1 used for each side wall is cut along one side to fit to a shape of the sidewall.

Fourth Embodiment

Figure 9:
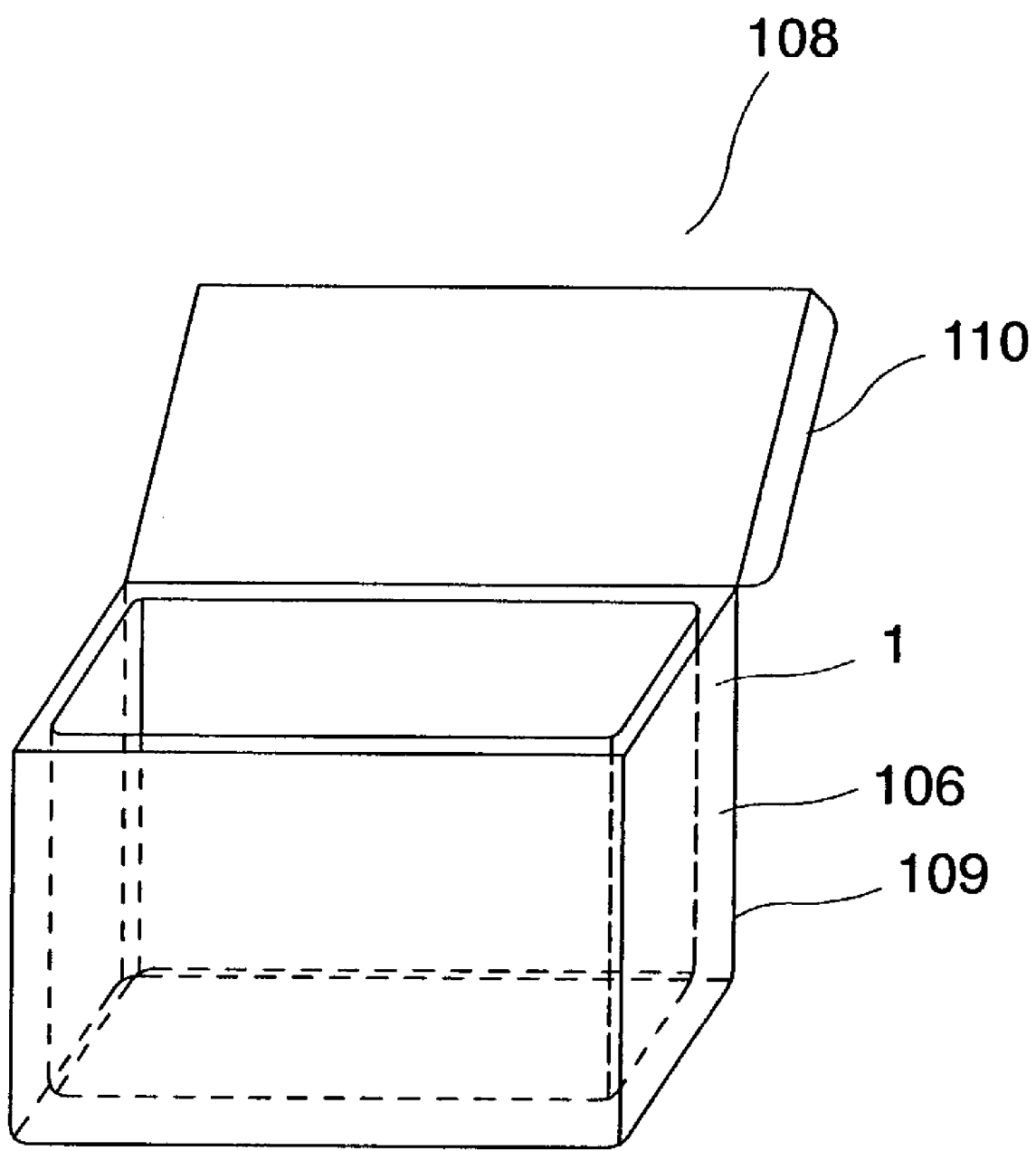
FIG. 9 is a schematic view of a heat insulation box in accordance with a fourth exemplary embodiment of the present invention.

FIG. 9 is a schematic view of a heat insulation box in accordance with an example of the present embodiment.

Heat insulation box 108 is used as a cooler, and comprises a box 109 and lid 110.

Figure 10:
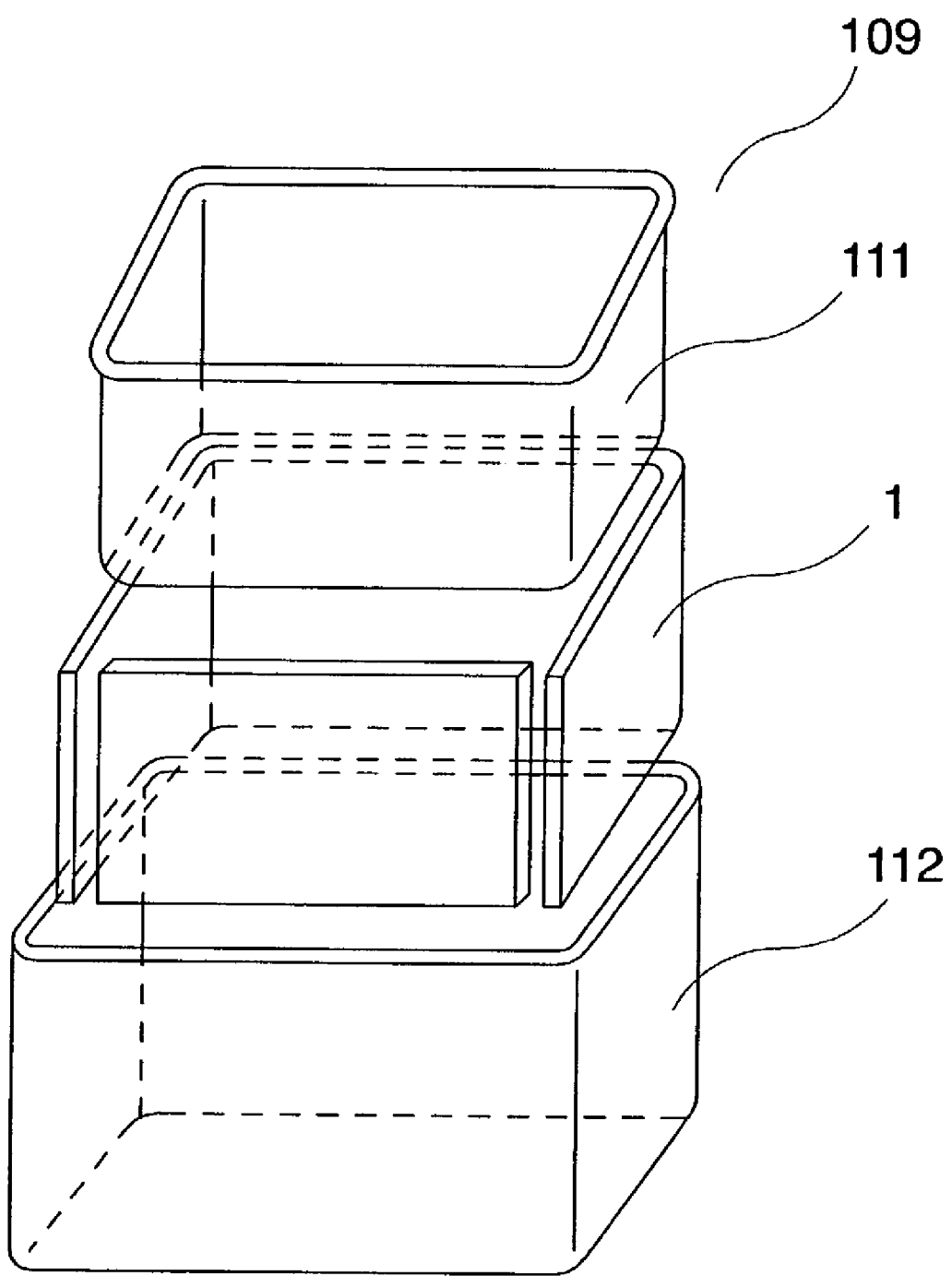
FIG. 10 is a schematic view of a heat insulation box in accordance with the fourth exemplary embodiment of the present invention.

FIG. 10 is a schematic view of a box in accordance with another example of the present embodiment.

Box 109 is integrally molded by adhering vacuum heat insulator 1 onto an inner surface of an outer box 112 using double-sided adhesive tape in a space formed between the inner box 111 and the outer box 112 made of polypropylene, and thereafter filling the space between inner box 111 and outer box 113 with urethane resin and then foaming the urethane as to surround the vacuum heat insulator with rigid urethane foam 106.

Figure 11:
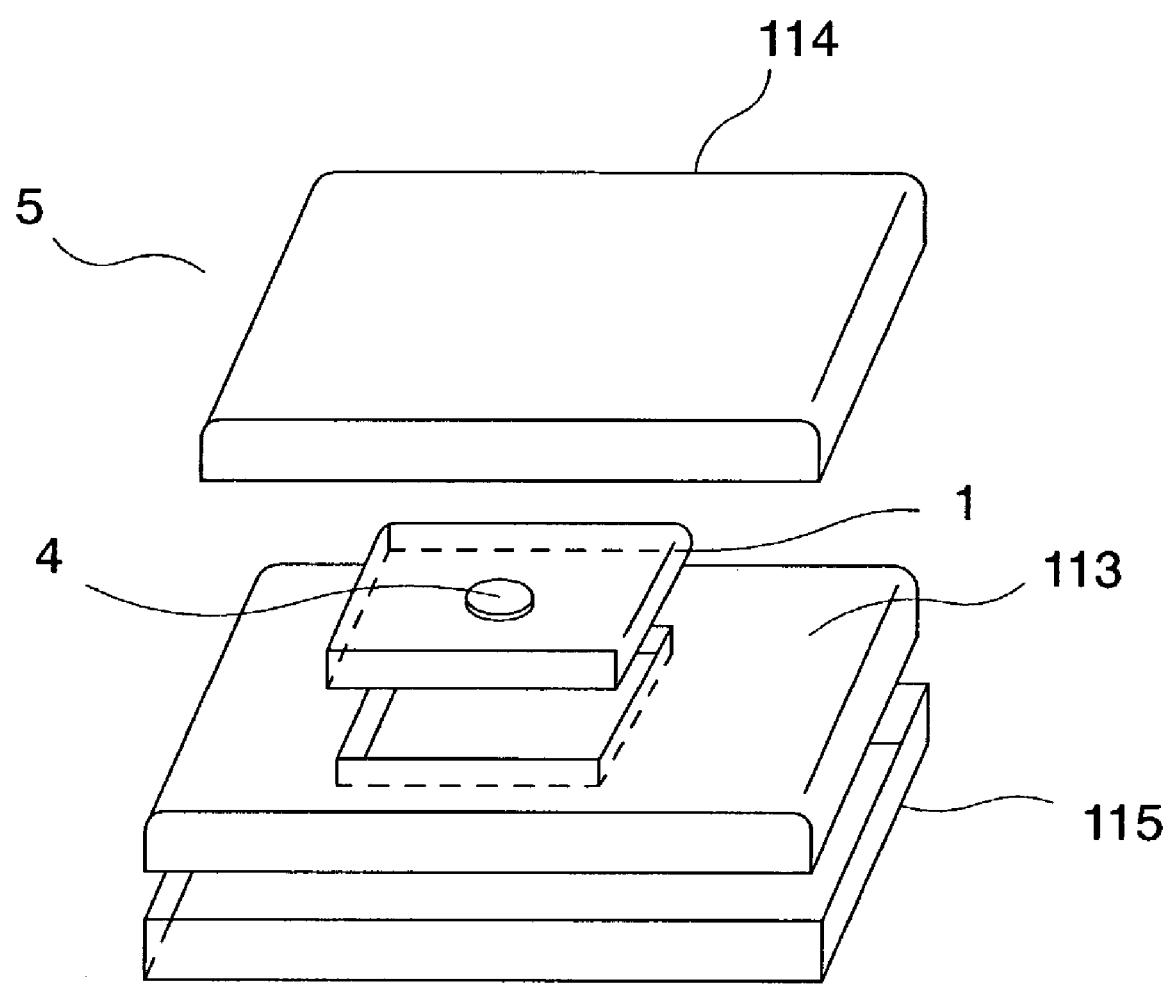
FIG. 11 is a schematic view of a lid in accordance with the fourth exemplary embodiment of the present invention.

FIG. 11 is a schematic view of a lid in accordance with still another example of the present embodiment.

Vacuum heat insulator 1 including adsorbent 4 is disposed in a foamed polystyrene 113, and packed in a space formed between an inner frame 114 and an outer frame 115.

With reference to FIG. 10, vacuum heat insulator 1 is made by bending a sheet of vacuum heat insulator 1 into the C-shape to fit to a shape of heat insulation box 109.

Having a sheet-form core, vacuum heat insulator 1 can be bent into the C-shape easily. This improves coverage of the vacuum heat insulator 1 on the heat insulation box 109, thus improving heat insulating properties of the heat insulation box 109.

With reference to FIG. 11, lid 110 comprises a foamed polystyrene 113 having a recess that has been formed corresponding to a shape of vacuum heat insulators, and the vacuum heat insulator is buried within the recess. The polystyrene is placed in a space formed between the inner frame 114 and the outer frame 115 made of polypropylene.

As the vacuum heat insulator 1 used for lid 110 is smaller than the vacuum heat insulator used for the box 109, a ratio of areas of sealing portions in enveloping member 3 increases in vacuum heat insulator 1. This is considered to give greater influence to gases entering from the sealing portions of the enveloping member over a long period time, and increases an aged degradation of performance of the vacuum heat insulator, and thus degrades heat insulating properties. For this reason, adsorbent 4 is used with the vacuum heat insulator 1 for the lid 110.

It is desirable to use an adsorbent 4 that is made of a room temperature activation type getter material for adsorbing and removing at least nitrogen, oxygen, moisture, and carbon dioxide. Specific examples include an oxygen adsorbent essentially consisting of iron powder, which is commercially available under a trade name of AGELESS, for example.

Fifth Embodiment

Figure 12:
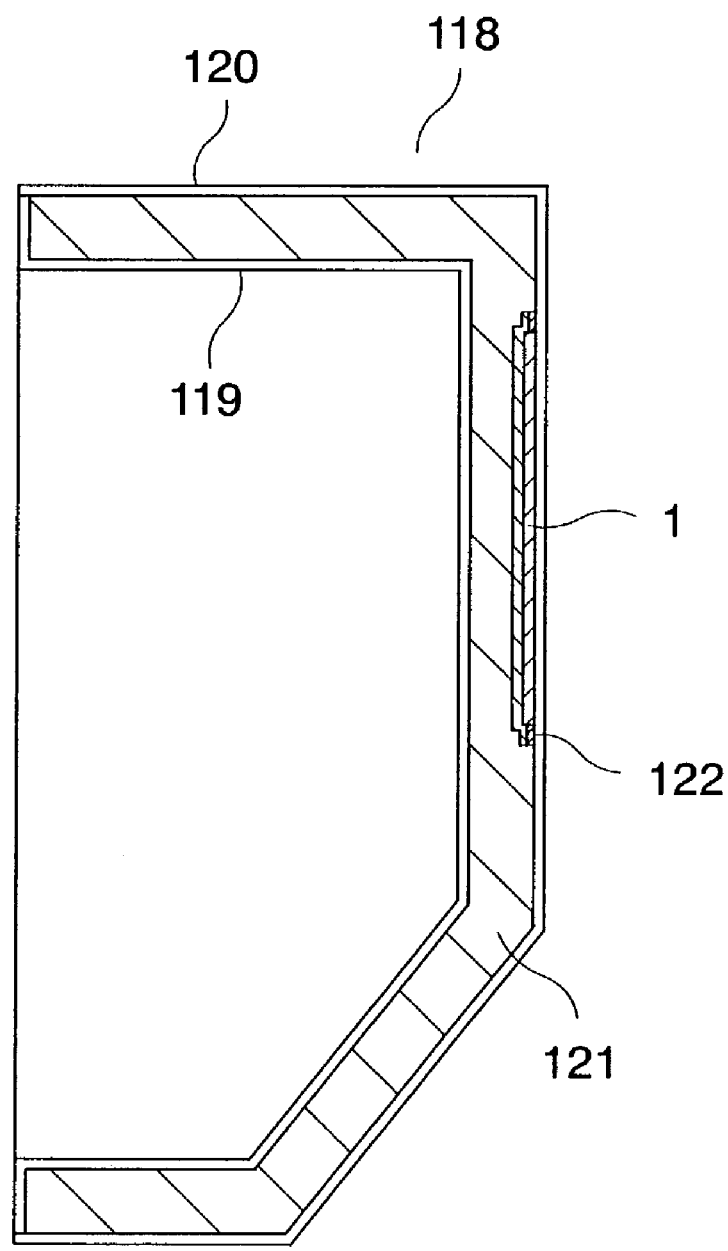
FIG. 12 is a sectional view of a heat insulation box in accordance with a fifth exemplary embodiment of the present invention.

FIG. 12 is a sectional view of a heat insulation box of the present embodiment.

Heat insulation box 118 forming a refrigerator comprises an inner box 119 of a vacuum-molded ABS resin, and an outer box 120 of a press-molded iron sheet. Vacuum heat insulator 1 is provided between the inner box 119 and the outer box 120, and space between the inner box and outer box is filled with urethane resin, which is foamed so as to surround the vacuum heat insulator with rigid urethane foam 121.

A thermoplastic resin 122 is applied to an inner surface of the outer box 120 beforehand so as to fit to an outer periphery of core 2 and has a width of 10 mm. Thermoplastic resin 122 is heat-sealed to the heat seal layer of enveloping member 3 of the vacuum heat insulator 1. Desirable thermoplastic resins include high-density polyethylene, low-density polyethylene, and polypropylene.

In the present embodiment, because a laminated sheets of an inorganic fiber that is light, excellent in surface planarity, and thin, is used as the core 2, an adhesive property between the vacuum heat insulator 1 and the inner surface of the outer box 120 is excellent. This improves the heat insulating properties. In addition by, being light and thin, the vacuum heat insulator 1 is not displaced by its own weight when attached to the inner surface of the outer box 120. Furthermore, by having a thin core 2, the vacuum heat insulator 1 does not hinder fluidity of urethane resin when it is filled into the space between the inner box 119 and the outer box 120 and foamed. Thus, rigid urethane foam can uniformly fill the space between the inner box 119 and the outer box 120 without forming any voids. Therefore, heat insulating properties of the entire heat insulation box 118 improves.

Sixth Embodiment

Figure 13:
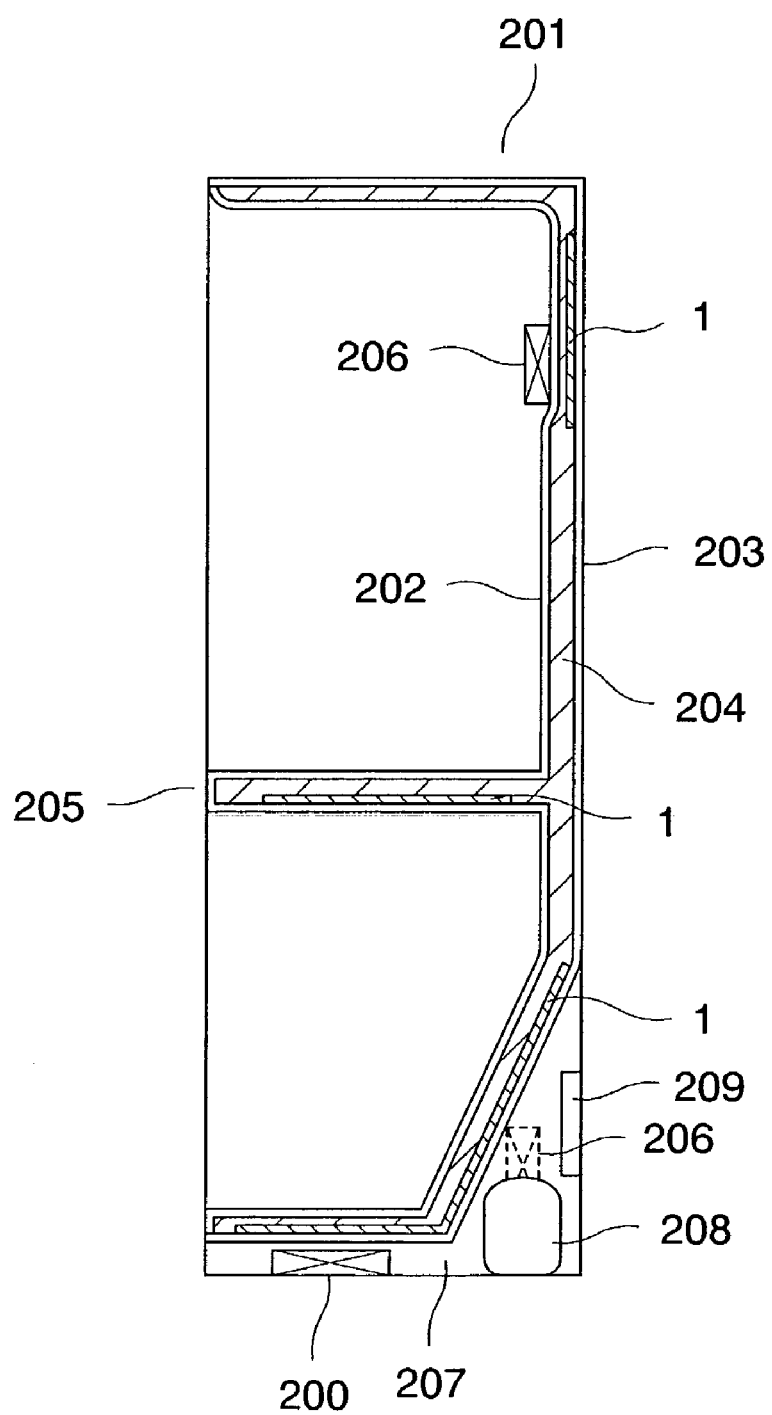
FIG. 13 is a sectional view of a refrigerator in accordance with a sixth exemplary embodiment of the present invention.

FIG. 13 is a sectional view of a refrigerator in accordance with an exemplary embodiment of the present invention.

Heat insulation box 201 comprises an inner box 202 of a vacuum-molded ABS resin and outer box 203 of a press-molded iron sheet, which are engaged with each other via a flange. Vacuum heat insulator 1 is provided inside of the outer box 203 beforehand, and then urethane resin is filled into a space between the inner box 202 and the outer box 203 and foamed so as to surround the vacuum insulation with rigid urethane foam 204.

Heat insulation box 201 is horizontally divided by a partition 205 into an upper part and a lower part. The upper part forms a refrigerator compartment and the lower part forms a freezer compartment. Two evaporators 206 are provided. One is used for cooling the refrigerator compartment and the other is used for cooling the freezer compartment.

In addition, a compressor 208, a control circuit board 209, and a condenser 200 are disposed in a machine room 207 at a bottom of the refrigerator. The evaporator 206 for cooling the freezer compartment is disposed outside of the machine room 207 and inside of the inner box 202. The heat insulation box 201 is formed so as to house the evaporator 206 in this manner.

Because the vacuum heat insulator 1 of the present invention has excellent heat insulating properties, even a thin sheet of the vacuum heat insulator can provide sufficient heat insulation, thus greatly contributing to increasing volume of storage space in the refrigerator. Especially, even though the disposition of the two evaporators 206 decreases a volume of the refrigerator compartment in the present embodiment, use of a thin and excellent vacuum heat insulator 1 can limit this decrease in volume.

Disposition of a plurality of sheets of vacuum heat insulator 1 on back, side, and top walls of the refrigerator can further increases volume of storage space in the refrigerator. However, disposition of a large number of vacuum heat insulators 1 may increase cost.

As for a method of disposing the vacuum heat insulator 1 of the present embodiment, the vacuum heat insulator is attached to an inside of the outer box 203 with double-sided adhesive tape or the like, and thereafter the space between the inner box 202 and outer box 203 is filled with urethane 204.

In addition, for the refrigerator of the present embodiment, the heat insulating part in partition 205 is also integrally filled with rigid urethane foam 204. The vacuum heat insulator 1 is also disposed in partition 205 to reduce a thickness of the partition. This contributes to increasing the volume of the storage space in the refrigerator.

In the present embodiment, the upper part of the heat insulation box 201 divided by the partition 205 is a refrigerator compartment, and the lower part is a freezer compartment. The refrigerator compartment may be further divided to also provide a crisper compartment, for example. The freezer compartment may be further divided to also provide an, ice-maker, and a partially freezing compartment.

Vacuum heat insulator 1 provided in a heat insulating part for separating machine room 207 from the freezer compartment is bent and shaped to fit to a shape the machine room 207. Using a sheet-shape core, the vacuum heat insulator 1 can be bent easily with excellent productivity. When a plurality of sheets of the vacuum heat insulator are combined for insulation in a conventional manner, gaps between sheets of the vacuum heat insulator cause degradation of heat insulating properties. In contrast, as shown in the present invention, use of a sheet of a vacuum heat insulator that can be bent results in an improvement in heat insulating properties that leads to an energy saving by allowing for a shorter operating time of the compressor 208.

In the present embodiment, the freezer compartment, the compressor 208, the control circuit board 209, and condenser 200 are insulated by a single vacuum heat insulator 1.

Therefore, a temperature increase in the freezer compartment caused by heat generated from the compressor, the control circuit board, and the condenser can be inhibited. In the present embodiment, because each of the compressor and freezer compartment, the control circuit board and freezer compartment, and the condenser and freezer compartment need not be insulated separately, heat insulation can be performed very efficiently.

In addition, because inorganic fibers are non-flammable, the vacuum heat insulator has a non-flammable structure and is unlikely to generate toxic gases. Therefore, the refrigerator using this vacuum heat insulator is also non-flammable. For such a reason, the refrigerator is also excellent in safety.

Furthermore, even when flammable substances such as carbon-hydride are used, for the refrigerator, as a foaming agent of the resin, refrigerant, or the like, the vacuum heat insulator has a non-flammable structure because inorganic fibers are used. Thus, the refrigerator of the present embodiment can be a refrigerator excellent in safety.

Seventh Embodiment

Figure 14:
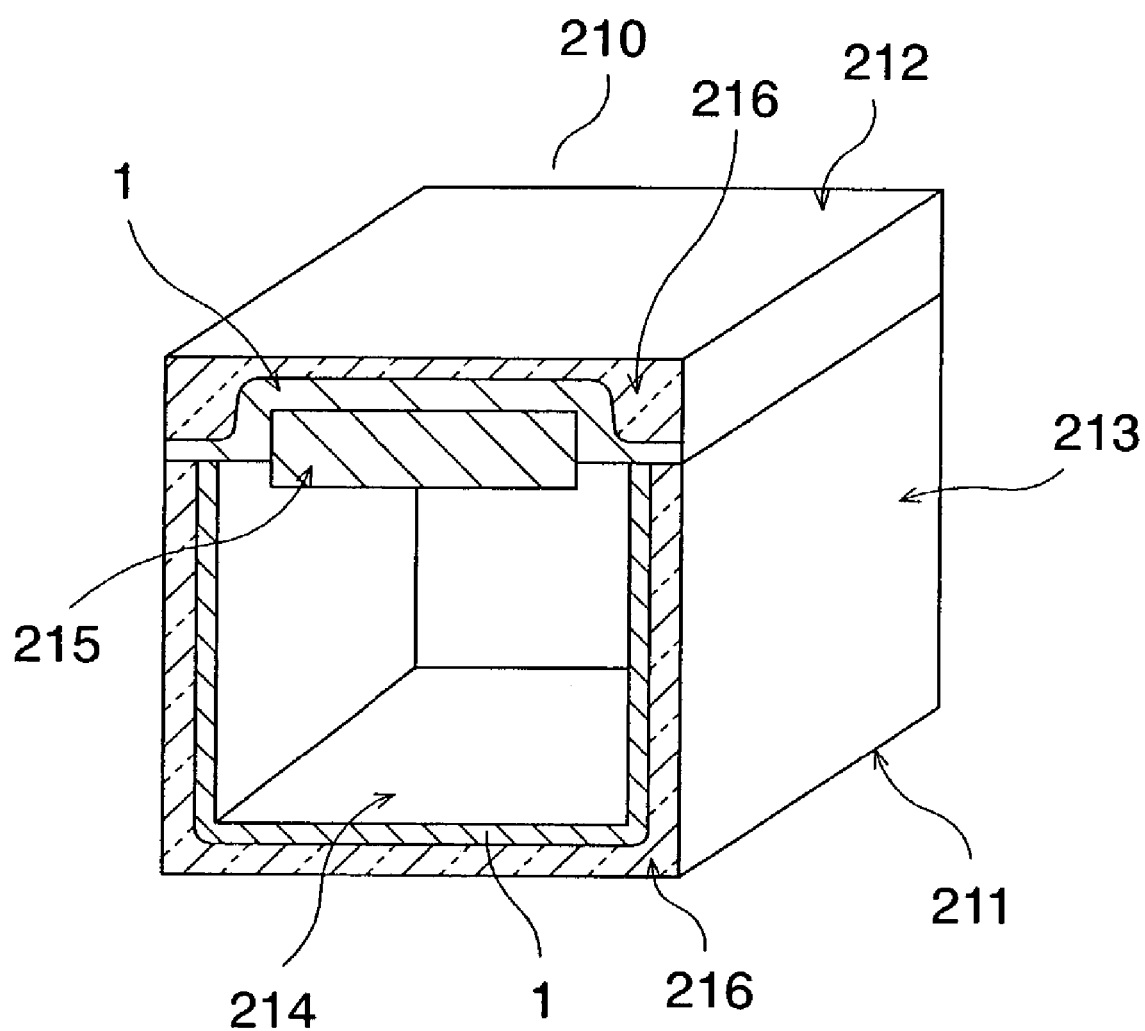
FIG. 14 is a sectional view of an insulation box in accordance with a seventh exemplary embodiment of the present invention.

FIG. 14 is a sectional view of heat insulation box 210 forming an insulation box, in accordance with the seventh embodiment of the present invention.

Insulation box 210 comprises a body 211, a lid 212, an outer box 213, an inner box 214, a cold storage unit 215, a heat insulator 216, and a vacuum heat insulator 1.

With regard to the insulation box 210, because vacuum heat insulator 1 of the present invention has flexibility, it can integrally be attached to an insulation box of a substantially cubic shape if it is bent beforehand. Thus, because a number of joints of vacuum heat insulator 1 can be reduced, heat leak from joints can be reduced.

Moreover, when protrusions and recesses for housing the cold storage unit 215 are formed in the lid 212, the vacuum heat insulator 1 can be attached to the protrusions and recesses because it has flexibility. Thus, heat insulation properties can be efficiently improved.

Because the insulation box 210 of the present embodiment can sufficiently use effects of the vacuum heat insulator 1, heat insulating properties, that the conventional insulation box could not provide, can be obtained. Therefore, such an insulation box can be used as a medical cold-box requiring stricter temperature control, as well as a leisure cooler.

Materials of the cold storage unit 215 are not specifically limited. Commercially available general cold storage agents can be used. The insulator 216 is not specifically limited as well. Examples of usable heat insulators include commercially available foamed resins such as a rigid urethane foam and polystyrene foam, and fiber materials such as glass wool.

Vacuum heat insulator 1 can be attached to either one of the outer box 213 and the inner box 214 in the body 211. In either case, the same effects can be obtained.

Eighth Embodiment

Figure 15:
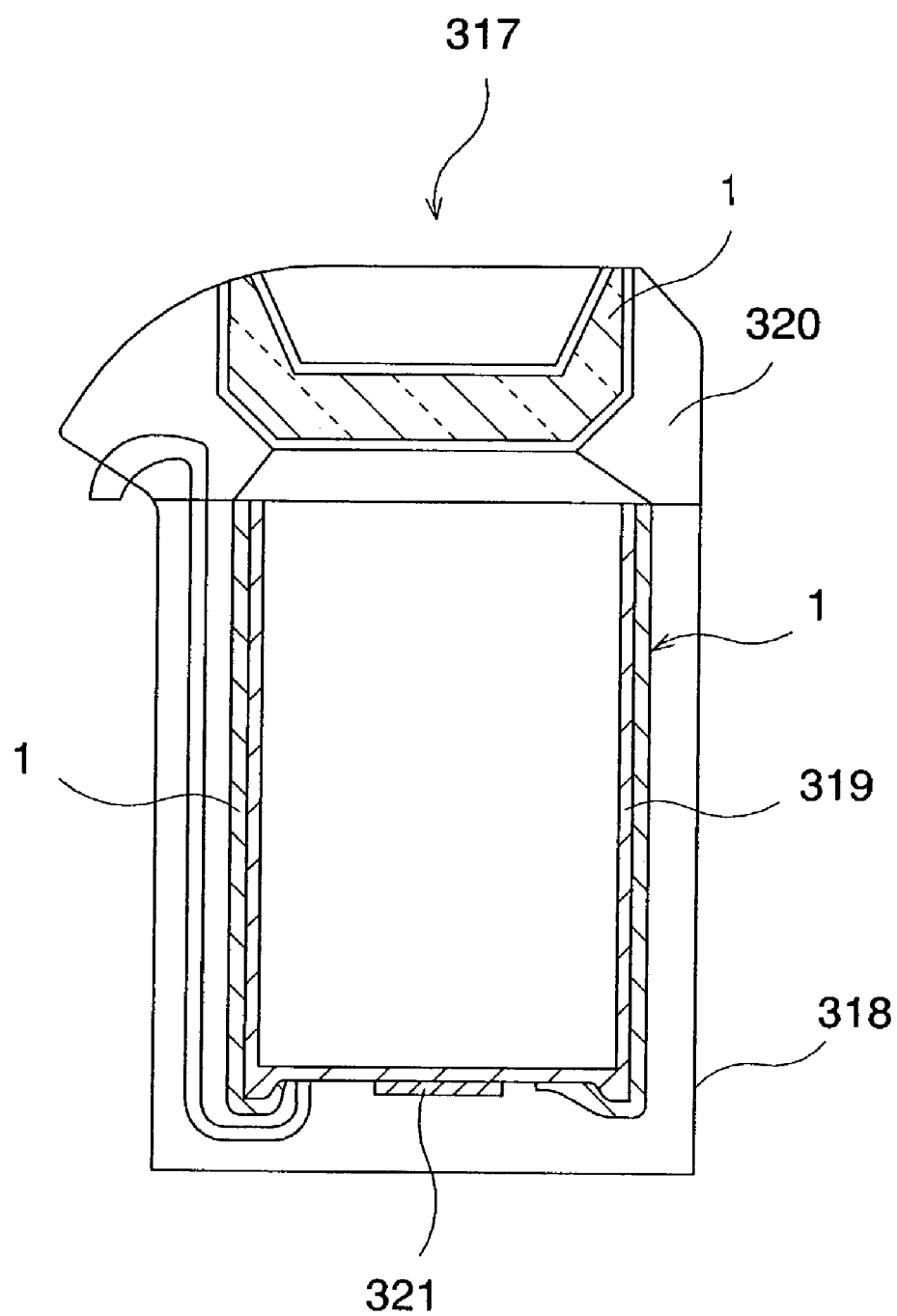
FIG. 15 is a sectional view of a water heater in accordance with an eighth exemplary embodiment of the present invention.

FIG. 15 is a sectional view of a water heater in accordance with an exemplary embodiment of the present invention. The water heater 317 comprises a body 318, a hot water reservoir 319, a lid 320, a heater 321, and vacuum heat insulators 1. The vacuum heat insulator 1 is attached so as to wind around an outside of the hot water reservoir 319. In addition, the vacuum heat insulator 1 is bent and extended to a vicinity of the heater 321. Furthermore, another vacuum heat insulator 1 is provided in a recess in the lid 320.

With a water heater 317 of such a structure, when inorganic fiber material having high heat resistance is used as core 2 of the vacuum heat insulator 1, the vacuum heat insulator 1 is unlikely to be degraded by heat. Thus, the vacuum heat insulator has no problem when the water heater is used even for a long period of time. Moreover, by having flexibility, the vacuum heat insulator 1 can be bent, extended to the vicinity of the heater, and used in the recess in the lid.

Because the vacuum heat insulator 1 has high heat resistance and flexibility, water heater 317 of the present embodiment can efficiently reduce power consumption and realize downsizing.

INDUSTRIAL APPLICABILITY

As described above, the vacuum heat insulator of the present invention uses laminated sheets of inorganic fibers as a core. The heat insulation box of the present invention uses the vacuum heat insulator of the present invention. Therefore, because the vacuum heat insulator generates very little gas through time and has excellent workability, a heat insulation box excellent in long-term reliability and productivity can be obtained. In addition, use of a thin sheet-form material as the core makes the heat insulation box thinner, thus contributing to a space saving of the heat insulation box.

Because the core used for this invention can be shaped easily, lamination and machining such as bending and formation of a cut-off portion, recess, or through hole, can be performed easily. Therefore, a vacuum heat insulator suitable for a required heat insulation portion can be produced easily and applied to a heat insulation box, such as a refrigerator. In other words, coverage of the vacuum heat insulator in the heat insulation box increases and thus heat insulating properties of the heat insulation box also improves. In addition, the vacuum heat insulator includes a thin sheet-form core. Therefore, when used for a partition in the heat insulation box, the vacuum heat insulator can provide a thin partition, thus allowing efficient use of space in the heat insulation box.

For these reasons, use of the vacuum heat insulator of the present invention for equipment requiring heat insulation, such as a refrigerator, accomplish improvement in productivity and energy saving as well as downsizing of equipment.

The invention claimed is:

1. A refrigerator comprising:
   a heat insulating box including
      an inner box having an opening,
      an outer box,
      a lid for closing said opening,
      at least one vacuum heat insulator disposed in a space between said inner box and said outer box at at least one of a back wall, a side wall and a top wall of the refrigerator, said at least one vacuum heat insulator comprising a core disposed in an enveloping member, and
      foamed resin filled in said space between said inner box and said outer box, said foamed resin employing a flammable substance as a foaming agent; and
   a cooling machine for cooling an inner space of said heat insulating box, said cooling machine employing a flammable substance as a refrigerant,
   wherein said core is made of a fibrous laminate of at least two sheets of inorganic fibers, with opposing faces of said sheets being in contact with each other, said inorganic fibers containing $SiO_2$ as a main composition of said inorganic fibers, and further containing $Al_2O_3$, CaO and MgO as material compositions, and
   wherein said enveloping member is made of a laminated film.

2. The refrigerator according to claim 1, wherein said laminated film includes a first portion on a first side of said core and a second portion on a second side of said core, with said first portion and said second portion having different structures relative to one another.

3. The refrigerator according to claim 1, further comprising an adsorbent in said at least one vacuum heat insulator.

4. The refrigerator according to claim 1, further comprising a freezer compartment at a bottom thereof and a machine room outside of said freezer compartment, wherein said at least one vacuum heat insulator includes a vacuum heat insulator that covers sidewalls of said freezer compartment.

5. The refrigerator according to claim 4, further comprising high-temperature refrigerant piping provided between said at least one vacuum heat insulator and said outer box.

6. The refrigerator according to claim 4, wherein said at least one vacuum heat insulator includes a vacuum heat insulator that is provided between said machine room and said freezer compartment.

7. The refrigerator according to claim 1, further comprising independent compartments having different temperature ranges, and an evaporator for each of said compartments, wherein said at least one vacuum heat insulator includes a vacuum heat insulator that is disposed in a heat insulating portion behind at least one of said evaporators.

8. The refrigerator according to claim 7, wherein said at least one vacuum heat insulator includes a vacuum heat insulator that is disposed in a partition between said independent compartments.

9. The refrigerator according to claim 1, further comprising a compressor, wherein said at least one heat insulator includes a vacuum heat insulator that is disposed in a partition between said compressor and said inner box.

10. The refrigerator according to claim 1, further comprising a control circuit board, wherein said at least one vacuum heat insulator includes a vacuum heat insulator that is disposed in a partition between said control circuit board and said inner box.

11. The refrigerator according to claim 1, further comprising a condenser in a bottom thereof, wherein said at least one vacuum heat insulator includes a vacuum heat insulator that is disposed in a partition between said condenser and said inner box.

12. The refrigerator according to claim 1, further comprising a thermoplastic resin layer on at least a portion of an inner surface partially defining said space between said outer box and said inner box, wherein said at least one vacuum heat insulator is adhered to said inner surface via said thermoplastic resin layer by performing a hot melt bonding operation.

13. The refrigerator according to claim 1, wherein
said at least one vacuum heat insulator includes plural vacuum heat insulators, with a first of said plural vacuum heat insulators positioned between a back wall of said inner box and a back wall of said outer box on an outer box side of said space, with a second of said plural vacuum heat insulators positioned between a top wall of said inner box and a top wall of said outer box on the outer box side of said space, with a third of said plural vacuum heat insulators positioned between a first side wall of said inner box and a first side wall of said outer box on the outer box side of said space, and with a fourth of said plural vacuum heat insulators positioned between a second side wall of said inner box and a second side wall of said outer box on the outer box side of said space.

14. The refrigerator according to claim 13, wherein said laminated film includes a first portion on a first side of said core and a second portion on a second side of said core, with said first portion and said second portion having different structures relative to one another.

15. The refrigerator according to claim 13, further comprising an adsorbent in each of said plural vacuum heat insulators.

16. The refrigerator according to claim 13, further comprising a freezer compartment at a bottom thereof and a machine room outside of said freezer compartment, wherein said at least one vacuum heat insulator includes a vacuum heat insulator that covers sidewalls of said freezer compartment.

17. The refrigerator according to claim 16, further comprising high-temperature refrigerant piping provided between one of said vacuum heat insulators and said outer box.

18. The refrigerator according to claim 16, wherein said at least one vacuum heat insulator includes a vacuum heat insulator that is provided between said machine room and said freezer compartment.

19. The refrigerator according to claim 13, further comprising independent compartments having different temperature ranges, and an evaporator for each of said compartments, wherein said at least one vacuum heat insulator includes a vacuum heat insulator that is disposed in a heat insulating portion behind at least one of said evaporators.

20. The refrigerator according to claim 19, wherein said at least one vacuum heat insulator includes a vacuum heat insulator that is disposed in a partition between said independent compartments.

21. The refrigerator according to claim 13, further comprising a compressor, wherein said at least one heat insulator includes a vacuum heat insulator that is disposed in a partition between said compressor and said inner box.

22. The refrigerator according to claim 13, further comprising a control circuit board, wherein said at least one vacuum heat insulator includes a vacuum heat insulator that is disposed in a partition between said control circuit board and said inner box.

23. The refrigerator according to claim 13, further comprising a condenser in a bottom thereof, wherein said at least one vacuum heat insulator includes a vacuum heat insulator that is disposed in a partition between said condenser and said inner box.

24. The refrigerator according to claim 13, further comprising a thermoplastic resin layer on at least a portion of an inner surface partially defining said space between said outer box and said inner box, wherein at least one of said plural vacuum heat insulators is adhered to said inner surface via said thermoplastic resin layer by performing a hot melt bonding operation.

* * * * *

UNITED STATES PATENT AND TRADEMARK OFFICE
CERTIFICATE OF CORRECTION

PATENT NO.       : 7,210,308 B2                                    Page 1 of 1
APPLICATION NO.  : 10/258130
DATED            : May 1, 2007
INVENTOR(S)      : Yasuaki Tanimoto et al.

It is certified that error appears in the above-identified patent and that said Letters Patent is hereby corrected as shown below:

ON THE TITLE PAGE

In Item (56), References Cited, under FOREIGN PATENT DOCUMENTS, replace "JP 8-303683    11/1999" with --JP    8-303683    11/1996--.

Signed and Sealed this

Thirtieth Day of October, 2007

JON W. DUDAS
*Director of the United States Patent and Trademark Office*